United States Patent
Bae et al.

(10) Patent No.: US 11,240,553 B2
(45) Date of Patent: *Feb. 1, 2022

(54) CONTROL METHOD AND DISPLAY APPARATUS PROVIDING VARIOUS TYPES OF CONTENT

(71) Applicant: SAMSUNG ELECTRONICS CO., LTD., Suwon-si (KR)

(72) Inventors: Hee-jeong Bae, Yongin-si (KR); Yong-hwan Kwon, Seongnam-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,972

(22) Filed: Jul. 24, 2020

(65) Prior Publication Data
US 2020/0359081 A1 Nov. 12, 2020

Related U.S. Application Data

(63) Continuation of application No. 15/948,508, filed on Apr. 9, 2018, now Pat. No. 10,771,839, which is a
(Continued)

(30) Foreign Application Priority Data
Dec. 14, 2011 (KR) .......................... 10-2011-0134222

(51) Int. Cl.
G06F 3/0482 (2013.01)
H04N 21/431 (2011.01)
(Continued)

(52) U.S. Cl.
CPC ....... H04N 21/4316 (2013.01); G06F 3/0482 (2013.01); G06F 3/04817 (2013.01);
(Continued)

(58) Field of Classification Search
CPC ............ G06F 3/0482; H04N 21/47217; H04N 21/47; H04N 21/4821
See application file for complete search history.

(56) References Cited

U.S. PATENT DOCUMENTS 5,594,509 A 1/1997 Florin et al.
5,737,029 A 4/1998 Ohkura et al.
(Continued)

FOREIGN PATENT DOCUMENTS

CN 1377555 A 10/2002
CN 1612599 A 5/2005
(Continued)

OTHER PUBLICATIONS

Communication dated Jan. 5, 2021 issued by the State Intellectual Property Office of P.R. China in counterpart Chinese Application No. 201811508863.4.
(Continued)

Primary Examiner — Phenuel S Salomon
(74) Attorney, Agent, or Firm — Sughrue Mion, PLLC

(57) ABSTRACT

A control method and display apparatus for providing various types of content is provided. The display apparatus includes a display unit which displays an image of contents; a storage unit which stores information regarding the contents; a UI generation unit which generates UIs regarding the contents; and a controller which shuts down a first content being executed, storing information regarding the shut down first content and controls generation and display of a UI regarding the first content on the display unit, when running a second content different from the first content, while the first content is running. The control method includes running contents and displaying the contents; running a second content that is different from a first content being run, according to a user input; shutting off the first content before
(Continued)

running the second content; storing the first content; and generating and displaying a UI regarding the first content.

23 Claims, 5 Drawing Sheets

Related U.S. Application Data continuation of application No. 14/849,678, filed on Sep. 10, 2015, now Pat. No. 9,986,284, which is a continuation of application No. 13/710,972, filed on Dec. 11, 2012, now Pat. No. 9,602,861.

(51) Int. Cl.
```
H04N 21/442      (2011.01)
H04N 21/482      (2011.01)
H04N 21/433      (2011.01)
H04N 21/47       (2011.01)
G06F 3/0481      (2013.01)
G06F 3/0484      (2013.01)
H04N 21/45       (2011.01)
H04N 21/472      (2011.01)
H04N 21/478      (2011.01)
H04N 21/81       (2011.01)
```

(52) U.S. Cl.
CPC ..... *G06F 3/04842* (2013.01); *H04N 21/4312* (2013.01); *H04N 21/4333* (2013.01); *H04N 21/44222* (2013.01); *H04N 21/4532* (2013.01); *H04N 21/47* (2013.01); *H04N 21/478* (2013.01); *H04N 21/47217* (2013.01); *H04N 21/482* (2013.01); *H04N 21/4821* (2013.01); *H04N 21/8153* (2013.01); *H04N 21/8173* (2013.01)

(56) References Cited

U.S. PATENT DOCUMENTS

| | | | |
|---|---|---|---|
| 5,835,717 A | 11/1998 | Karlton et al. | |
| 6,141,003 A | 10/2000 | Chor et al. | |
| 6,349,410 B1 | 2/2002 | Lortz | |
| 6,856,332 B2* | 2/2005 | Kim | H04N 21/4854 715/810 |
| 8,640,166 B1 | 1/2014 | Craner | |
| 2002/0056098 A1 | 5/2002 | White | |
| 2004/0128700 A1 | 7/2004 | Pan | |
| 2005/0094031 A1* | 5/2005 | Tecot | H04N 21/43615 348/473 |
| 2005/0235319 A1 | 10/2005 | Carpenter et al. | |
| 2005/0238317 A1 | 10/2005 | Horiguchi et al. | |
| 2006/0174273 A1 | 8/2006 | Park et al. | |
| 2006/0294557 A1 | 12/2006 | Morris et al. | |
| 2007/0009229 A1* | 1/2007 | Liu | H04N 5/44591 386/230 |
| 2007/0150368 A1* | 6/2007 | Arora | G06Q 30/0255 705/26.1 |
| 2007/0186177 A1* | 8/2007 | Both | G06F 3/04817 715/764 |
| 2007/0186267 A1* | 8/2007 | Ohde | H04N 21/44222 725/135 |
| 2007/0192791 A1 | 8/2007 | Sullivan et al. | |
| 2008/0005240 A1* | 1/2008 | Knighton | G06Q 30/016 709/204 |
| 2008/0034389 A1* | 2/2008 | Park | H04N 21/488 725/39 |
| 2008/0082921 A1 | 4/2008 | Negi | |
| 2008/0095516 A1 | 4/2008 | Katagishi et al. | |
| 2008/0104521 A1 | 5/2008 | Dubinko et al. | |
| 2008/0163296 A1 | 7/2008 | Shin et al. | |
| 2009/0132921 A1 | 5/2009 | Hwangbo et al. | |
| 2009/0154898 A1 | 6/2009 | Barrett et al. | |
| 2009/0178083 A1 | 7/2009 | White et al. | |
| 2009/0199106 A1 | 8/2009 | Jonsson et al. | |
| 2009/0204929 A1* | 8/2009 | Baurmann | H04N 21/478 715/836 |
| 2010/0083304 A1 | 4/2010 | Pan | |
| 2010/0262938 A1 | 10/2010 | Woods et al. | |
| 2011/0107226 A1 | 5/2011 | Heo | |
| 2012/0019721 A1* | 1/2012 | Choi | H04N 21/42204 348/564 |
| 2012/0054803 A1 | 3/2012 | Lee et al. | |
| 2012/0096392 A1 | 4/2012 | Ording et al. | |
| 2012/0304229 A1 | 11/2012 | Choi et al. | |
| 2012/0331020 A1 | 12/2012 | Morishita | |
| 2013/0014150 A1* | 1/2013 | Seo | G06F 3/04842 725/14 |
| 2014/0281998 A1 | 9/2014 | Hwangbo et al. | |

FOREIGN PATENT DOCUMENTS

| | | |
|---|---|---|
| CN | 1777254 A | 5/2006 |
| CN | 101119452 A | 2/2008 |
| CN | 101150699 A | 3/2008 |
| CN | 100405836 C | 7/2008 |
| CN | 101212592 A | 7/2008 |
| CN | 101909201 A | 12/2010 |
| CN | 101924891 A | 12/2010 |
| CN | 101945234 A | 1/2011 |
| CN | 102016838 A | 4/2011 |
| EP | 1 528 566 A2 | 5/2005 |
| JP | 11-32272 A | 2/1992 |
| JP | 8-140003 A | 5/1996 |
| JP | 10-145689 A | 5/1998 |
| JP | 2002-519950 A | 7/2002 |
| JP | 2005-51493 A | 2/2005 |
| KR | 10-2009-0050577 A | 5/2009 |
| KR | 10-2010-0030820 A | 3/2010 |
| KR | 10-2011-0049492 A | 5/2011 |
| KR | 10-1517638 B1 | 5/2015 |
| KR | 10-1556165 B1 | 9/2015 |
| WO | 2007/078847 A2 | 7/2007 |
| WO | 2011/115083 A1 | 9/2011 |
| WO | 2011/132984 A2 | 10/2011 |

OTHER PUBLICATIONS

Communication dated Apr. 29, 2019 issued by the State Intellectual Property Office of P.R. China in counterpart Chinese Application No. 201210538939.4.
Wikipedia "Android version history" retrieved from https://en.wikipedia.org/wiki/Android_version_history (75 pages total).
Communication, dated Mar. 27, 2013, issued by the European Patent Office in counterpart European Patent Application No. 12197199.8.
Communication dated Jul. 8, 2016, issued by the United States Patent and Trademark Office in counterpart U.S. Appl. No. 13/710,972.
Communication dated Nov. 8, 2017 issued by the Korean Intellectual Property Office in counterpart Application No. 10-2017-0087367.
Communication dated Mar. 14, 2018, from the State Intellectual Property Office of People's Republic of China in counterpart Application No. 201710499225.X.
Communication dated Jul. 8, 2016 issued by the United States Patent and Trademark Office in counterpart U.S. Appl. No. 14/849,678.
Communication dated Jan. 21, 2016 issued by the European Patent Office in counterpart European Patent Application No. 12 197 199.8.
Communication dated Dec. 4, 2015 issued by the U.S. Patent and Trademark Office in counterpart U.S. Appl. No. 14/849,678.
Communication dated Aug. 9, 2016, issued by the Japanese Intellectual Property Office in counterpart Japanese Patent Application No. 2012-272761.
Google "Google Android 3.0 Table PC honey comb to jump off attack" Feb. 8, 2011, (14 pages total).

(56) References Cited

OTHER PUBLICATIONS

Communication dated Nov. 30, 2016, issued by the United States Patent and Trademark Office in counterpart U.S. Appl. No. 14/721,632.
Communication dated Jul. 3, 2017 by the European Patent Office in counterpart European Patent Application No. 12197199.8.
Communication dated May 19, 2016 issued by the United States Patent and Trademark Office in counterpart U.S. Appl. No. 14/721,632.
Communication dated Jun. 25, 2015 issued by the U.S. Patent and Trademark Office in counterpart U.S. Appl. No. 13/710,972.
Communication dated Jul. 3, 2017 issued by the United States Patent & Trademark Office in counterpart U.S. Appl. No. 14/849,678.
Communication dated Jan. 2, 2017, issued by the European Patent Office in counterpart European application No. 12197199.8.
Communication dated Dec. 30, 2016, issued by the Korean Intellectual Property Office in counterpart Korean application No. 10-2011-0134222.
Communication dated Apr. 7, 2017, issued by the United States Patent and Trademark Office in counterpart U.S. Appl. No. 14/721,632.
Communication dated Jul. 31, 2019, from the State Intellectual Property Office of People's Republic of China in counterpart Application No. 201210538939.4.
Communication dated Jun. 24, 2016, issued by the Korean Intellectual Property Office in counterpart Korean Patent Application No. 10-2011-0134222.
Communication dated Mar. 3, 2015 issued by the U.S. Patent and Trademark Office in counterpart U.S. Appl. No. 13/710,972.
First Office Action issued in the Chinese Patent Office in Chinese Patent Application No. 2012105389394 dated Feb. 4, 2017.
Communication dated Dec. 24, 2015 issued by the U.S. Patent and Trademark Office in counterpart U.S. Appl. No. 13/710,972.
Communication dated Sep. 19, 2018, from the State Intellectual Property Office of People's Republic of China in counterpart Application No. 201210538939.4.
Communication dated Dec. 4, 2017 issued by the State Intellectual Property of P.R. China in counterpart Application No. 201210538939.4.
Communication dated Dec. 18, 2015 issued by the Korean Intellectual Property Office in counterpart Korean Patent Application No. 10-2011-0134222.
Communication dated Jul. 24, 2014 issued by the U.S. Patent and Trademark Office in counterpart U.S. Appl. No. 13/710,972.
Communication dated Mar. 20, 2018, from the State Intellectual Property Office of People's Republic of China in counterpart Application No. 201210538939.4.
"Honeycomb" Android Developers, retrieved from (https://developer.android.com/dev-challenge), (pp. 1-9).
Communication dated May 13, 2021 issued by the State Intellectual Property Office of the P.R.China in English application No. 201911050533.X.
Communication dated Aug. 4, 2021 by the State Intellectual Property Office of P.R. China in counterpart Chinese Patent Application No. 201811508863.4.
Communication dated Oct. 25, 2021, from The China National Intellectual Property Administration in Application No. 201911050533.X.
Communication dated Nov. 22, 2021, from The China National Intellectual Property Administration in Application No. 201811508863.4.

* cited by examiner

CONTROL METHOD AND DISPLAY APPARATUS PROVIDING VARIOUS TYPES OF CONTENT

CROSS-REFERENCE TO RELATED APPLICATIONS

This is a continuation of U.S. application Ser. No. 15/948,508, filed Apr. 9, 2018, which is a continuation of U.S. patent application Ser. No. 14/849,678 filed Sep. 10, 2015, now U.S. Pat. No. 9,986,284, which is a continuation of U.S. patent application Ser. No. 13/710,972 filed Dec. 11, 2012, now U.S. Pat. No. 9,602,861, which claims priority from Korean Patent Application No. 10-2011-0134222, filed on Dec. 14, 2011 in the Korean Intellectual Property Office. The entire disclosures of the prior applications are considered part of the disclosure of the present continuation application, and are hereby incorporated by reference in their entireties.

BACKGROUND

1. Field

Methods and apparatuses consistent with the exemplary embodiments relate to a display apparatus and a control method thereof. More particularly, the exemplary embodiments relate to a display apparatus providing various types of content, and a control method thereof.

2. Description of the Related Art

Conventionally, TVs merely serve to select a broadcast channel and to receive and output broadcast signals transmitted from broadcasting stations via a wire or wireless communication. However, in response to demands of users to utilize various contents, some latest TVs provide a function of executing various contents, such as playing multimedia files from external image sources, running applications including games and music and searching on the Internet, in addition to watching broadcasts.

To utilize desired contents, a user is required to access an application providing the contents. Even with such a function, however, currently released TVs can execute only a single content due to hardware limitations.

Thus, to run a second content while a first content is running, the user experiences the inconvenience of going back to the previously executed first content.

SUMMARY

Accordingly, one or more exemplary embodiments provide a display apparatus, such as TV, which provides an environment which enables users to easily access desired contents.

The foregoing and/or other aspects may be achieved by providing a display apparatus including a display unit which displays an image of contents; a storage unit which stores information regarding the contents; a UI generation unit which generates UIs regarding the contents; and a controller which shuts down a first content being executed, storing, in the storage unit information regarding the shut down first content and controls the UI generation unit to generate and display a UI regarding the first content on the display unit, when running a second content that is different from the first content, while the first content is running. The controller runs the first content when the UI regarding the shut down first content is selected according to user input. The controller resumes execution of the first content at a time of shutting down the first content. The controller displays together the UI regarding the first content and a UI regarding the second content, when executing a third content, different from the first content and the second content, while the second content is running. In addition, the controller classifies the contents according to a category based on user history of contents use and controls display of a UI in each category on the display unit. The controller controls display of a UI regarding at least one content shut down on the display unit. Further, the UIs are displayed in order of latest shut down and the UIs are displayed in order of execution frequency. Moreover, the UIs are displayed as a thumbnail image which corresponds to a screen at a time when the first content is shut down.

The exemplary embodiments further include a display apparatus having a display unit which displays an image of contents; a storage unit which stores information regarding the contents; a UI generation unit which generates UIs regarding the contents; and a controller which controls classifying the contents according to a category based on a user history of contents use and displays a UI in each category on the display unit.

In addition, the controller shuts down a first content when running a second content that is different from the first content while the first content is running. Furthermore, the controller runs a content shut down the most recently from among contents included in the category when the UI in the category is selected according to a user input. Moreover, the controller runs a content executed the most frequently from among contents included in the category when the UI in the category is selected according to a user input.

The exemplary embodiments further include a method of controlling a display apparatus, the method providing for running contents and displaying an image including the contents; running a second content that is different from a first content being run, according to a user input; shutting off the first content before running the second content; storing information regarding the first content; and generating and displaying a UI regarding the first content.

The exemplary embodiments also provide for running the first content when the UI regarding the shut down first content is selected according to a user input and resuming execution of the first content at a time of shutting down the first content.

The exemplary embodiments also provide for displaying together the UI regarding the first content and a UI regarding the second content together when executing a third content, different from the first content and the second content, while the second content is running, and classifying the contents according to a category based on a user history of contents use and displaying a UI in each category on the display unit.

The displaying comprises displaying a UI regarding at least one content that has been shut down. The UI is displayed in order of the latest content that has been shut down. Also, the UI is displayed in order of execution frequency. Further, the UI is displayed as a thumbnail image which corresponds to a screen at a time when the first content is shut down.

The exemplary embodiments further provide for a method of controlling a display apparatus, the method including running contents and displaying an image including the contents; classifying the contents according to a category based on a user history of contents use; and displaying a UI in each category on a display, and shutting down a first content when running a second content that is different from the first content while the first content is running.

The exemplary embodiments further include running a content most recently shut down from among contents included in the category when the UI in the category is selected according to a user input. The exemplary embodiments further include running a content executed the most frequently from among contents included in the category, when the UI in the category is selected according to a user input.

The exemplary embodiments further include a display apparatus including a display unit which displays contents; a UI generation unit which generates UIs regarding the contents; and a controller which controls classifying the contents according to categories based on a user history of contents use and displays a UI in each category.

The exemplary embodiments further include a method of controlling a display apparatus, the method including running contents and displaying an image including the contents; classifying the contents according to categories based on a user history of contents use; and displaying a UI in each category.

As described above, there is provided a display apparatus and control method which allows easy access to desired contents when a user wants to utilize various contents through the display apparatus.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
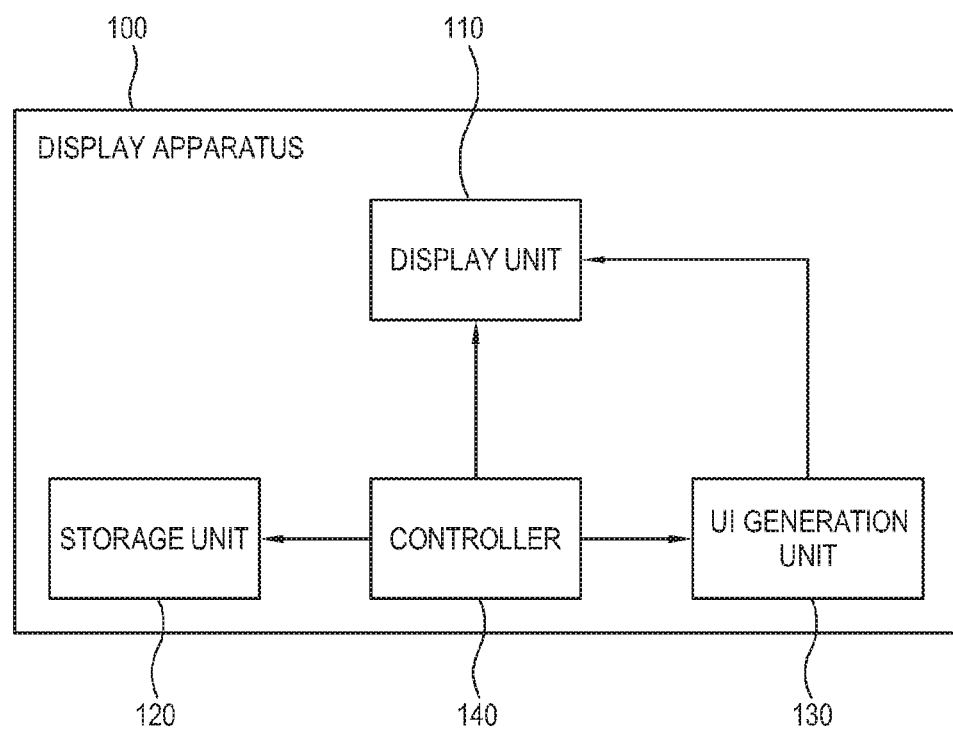
FIG. 1 is a block diagram of a display apparatus according to an exemplary embodiment.

Below, exemplary embodiments will be described in detail with reference to the accompanying drawings so as to be easily understood by a person having ordinary skill in the art. The exemplary embodiments may be embodied in various forms without being limited to the exemplary embodiments set forth herein. Descriptions of well-known parts are omitted for clarity and conciseness, and like reference numerals refer to like elements throughout.

Hereinafter, a display apparatus 100 according to a first exemplary embodiment is described.

FIG. 1 is a block diagram of the display apparatus 100 according to the exemplary embodiment.

As shown in FIG. 1, the display apparatus 100 according to an exemplary embodiment includes a display unit 110, a storage unit 120, a user interface (UI) generation unit 130 and a controller 140. The display apparatus 100 may be configured as a TV that is capable of running various contents.

The display unit 110 displays an image of a content being executed. In addition to broadcast channels, the display unit 110 may display images of various types of contents run by the display apparatus 100 and may display a contents bar including a plurality of UIs, which will be described below. The display unit 110 may include a display panel (not shown) to display images on, e.g., a liquid crystal display (LCD) and a plasma display panel (PDP). A panel driver (not shown) drives the display panel to display images, but is not limited thereto.

The storage unit 120 stores information regarding a content according to control by the controller 140. The storage unit 120 may store information regarding first contents when a second content is executed while the first contents are running. The stored information may include the kind of first contents, a time at which the contents are paused, a screen at a time of pausing the contents, and the like. The storage unit 120 may be configured as a storage device including a nonvolatile memory, e.g., a hard disk drive, embedded in the display apparatus 100, but is not limited thereto.

The UI generation unit 130 generates a UI regarding a content. In particular, the UI generation unit 130 may generate and display on display unit 110 a UI regarding the first contents, which are shut down. The UI displayed on the display unit 110 may include a plurality of UIs which respectively correspond to the first contents, and the UIs may be displayed corresponding to respective categories by classifying the contents by category.

Here, the UIs may be displayed as a thumbnail image which corresponds to a screen at a time when the first contents are shut down. Accordingly, a user may easily recognize a layout of the entire screen presented at the time of shutting down the contents, which correspond to the respective UIs.

The controller 140 controls overall operations of the display apparatus 100. The controller 140 may include a control program, a nonvolatile memory, such as a read-only memory (ROM) storing the control program and a flash memory, a volatile memory, such as a random-access memory which at least part of the stored control program is loaded into, and a microprocessor, such as a central processing unit (CPU) running the loaded control program and a micro-control unit (MCU), which are not shown in FIG. 1.

When receiving input of an instruction to execute the second content which is different from the first contents, through a key input unit (not shown) or a remote controller (not shown) provided on the display apparatus 100, while running the first contents, the controller 140 may run the second content and shut down the first contents being executed. Accordingly, only a single content may be run at a given time.

When the first contents are shut down, the controller 140 controls the storage unit 120 to store the information regarding the first contents which were shut down. As described above, the information stored in the storage unit 120 may include the kind of first contents, a time at which the contents are paused, a screen at a time of pausing the contents, and the like.

Further, when the first contents are shut down, the controller 140 may control the UI generation unit 130 to generate the UI regarding the first contents which have been shut down, for display on the display unit 110. The UI regarding the first contents may be displayed as a thumbnail image which corresponds to a screen at a time when the first contents are shut down, with information such as the kind and title of the contents being presented together.

When executing a third content, different from the first contents and the second content, while the second content is running, the controller 140 may perform control to display together, the UI regarding the first contents and a UI regarding the second content. Accordingly, a history of contents run in the display apparatus 100 may be readily identified.

Figure 2:
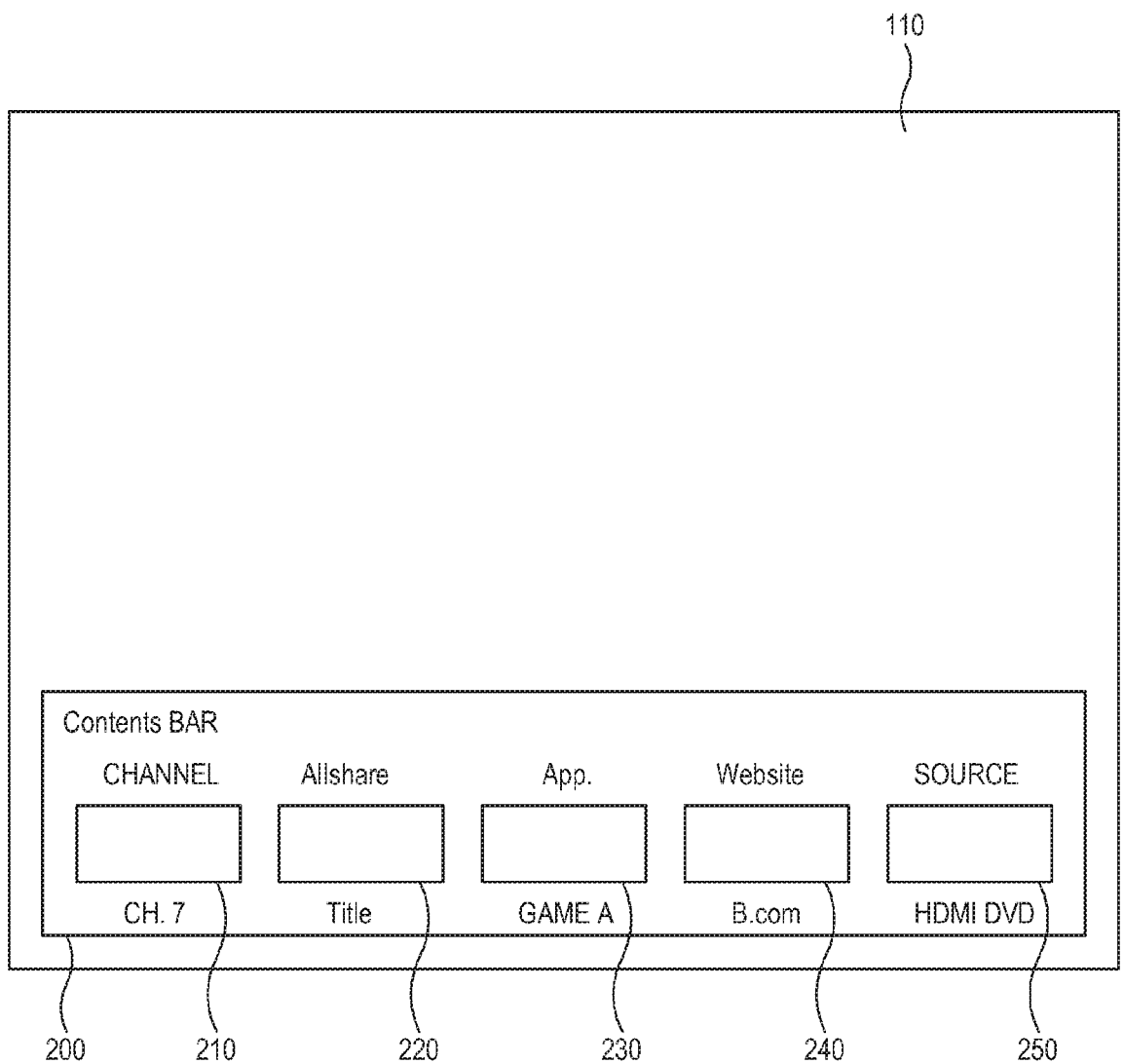
FIG. 2 shows an illustrative screen displaying a plurality of user interfaces by category.

As shown in FIG. 2, UIs corresponding to each category may be inclusively displayed in a contents bar 200. That is, UIs classified by category, e.g., recently viewed channel 210, recently connected Allshare 220, recently used application 230, recently retrieved website 240 and recently connected image source 250, may be displayed. For example, as a broadcast channel, a channel last tuned to based on channel tuning by a tuner is displayed. In multimedia files through Allshare, a last played scene is displayed. A site retrieved the most recently in the history of a web browser is displayed as a website.

As illustrated, a category name of a content, a thumbnail of a screen at a time of shut down and a subtitle of a content may be displayed together. When a user selects a particular UI, a content shut down the most recently or a content executed the most frequently may be run among contents included in the category.

Figure 3:
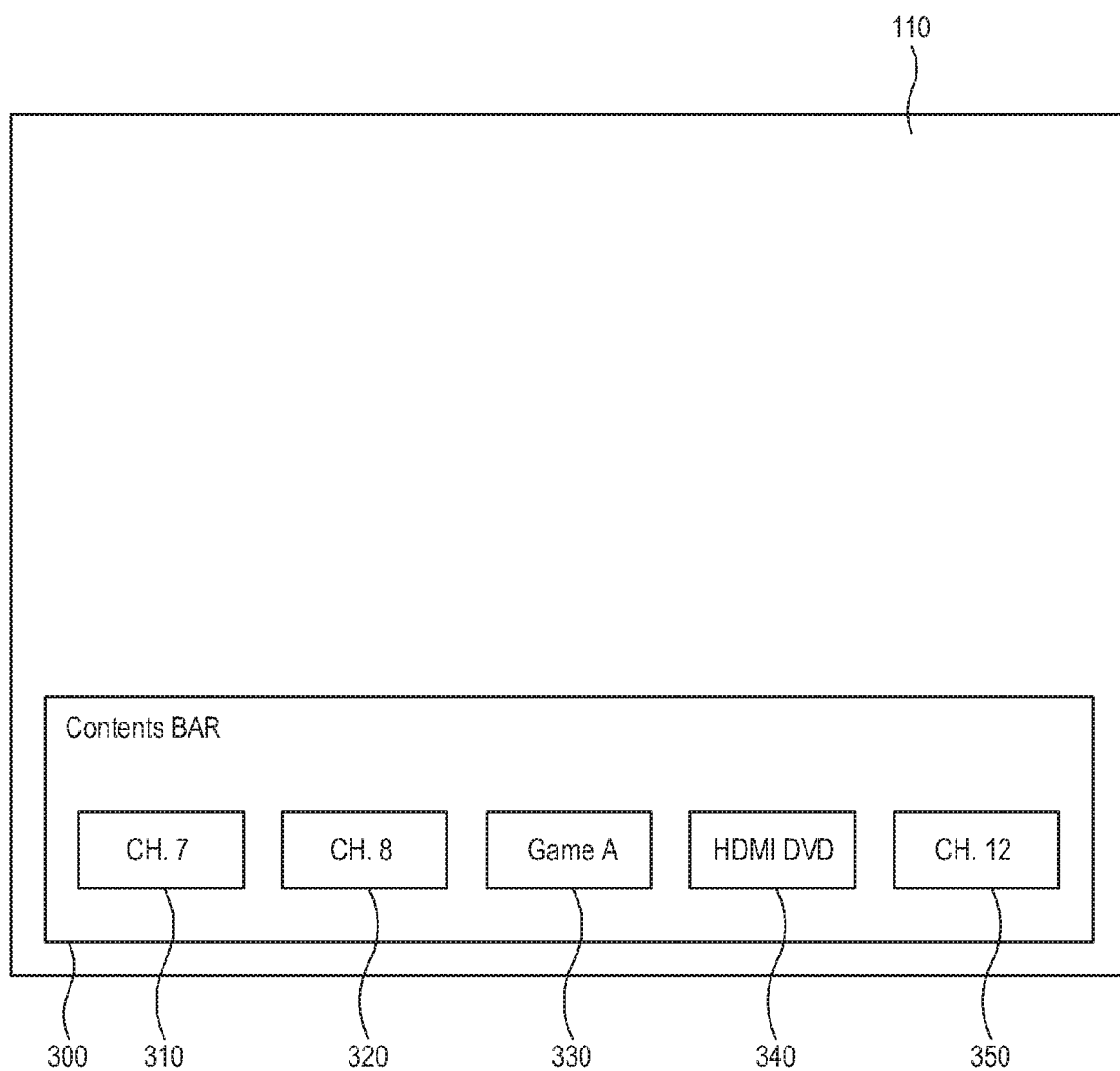
FIG. 3 shows an illustrative screen displaying a plurality of user interfaces in order of latest shut down or execution frequency.

As shown in FIG. 3, UIs respectively corresponding to shut down contents are included in a contents bar 300, being displayed in order of latest shut down. That is, the UIs may be displayed in sequence of channel 7 310, channel 8 320, game A 330, HDMI connected DVD 340 and channel 12 350 in order of latest to earliest shut down contents.

A user may select a UI corresponding to each content through the key input unit or the remote controller to conveniently run the content. Further, when a user pushes a particular button on the key input unit or remote controller, the display apparatus 100 according to an exemplary embodiment may enable immediate execution of a latest run content (channel 7 in FIG. 3). Accordingly, except for a content currently running, a previously executed content is conveniently selected and run, providing convenience to the user.

Alternatively, the controller 140 may control display of a plurality of UIs in the order of execution frequency. That is, as shown in FIG. 3, the UIs corresponding to respective contents may be inclusively displayed in the contents bar 300 in order of highest execution frequency for a particular period of time.

When a user selects a particular UI from among the UIs through the key input unit or remote controller, the controller 140 controls, according to a user input, the running of a content which corresponds to the selected UI. Here, the controller 140 may resume execution of the content from a time of shutting down the previous content. Accordingly, when the user reruns the previously run content after changing a content, the user may conveniently resume the content from a part being run at the time of shut down. In particular, when only a single content is allowed to run due to limitations in hardware, the user may arbitrarily conduct a change of contents.

Hereinafter, a display apparatus 100 according to a second exemplary embodiment is described. Descriptions of the same features as in the first embodiment are omitted for purposes of clarity and conciseness.

A controller 140 classifies contents according to category based on a user history of contents use. The use history corresponds to a list of contents run through the display apparatus 100. The controller 140 controls display UIs in each category on a display unit 110.

Figure 4:
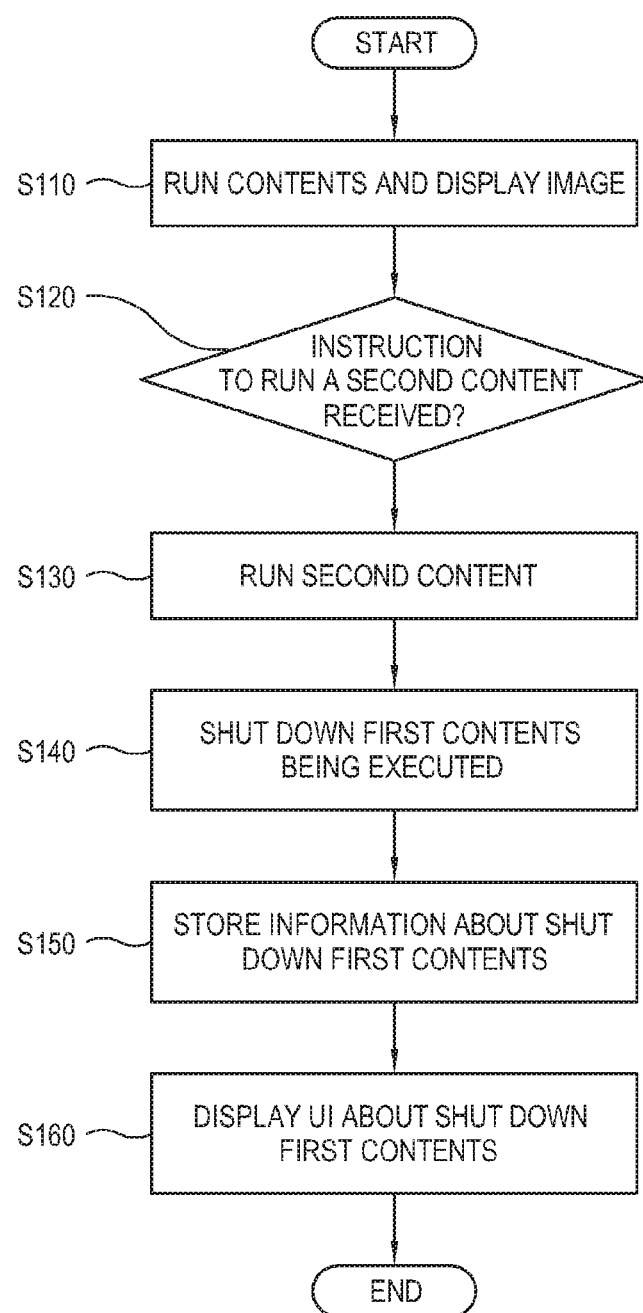
FIG. 4 is a first flowchart illustrating a control process of the display apparatus according to the exemplary embodiment.

FIG. 4 is a first flowchart illustrating a control process of the display apparatus 100 according to an exemplary embodiment.

The display apparatus 100 according to this exemplary embodiment may be used not only for watching broadcasts but for utilizing various contents. The display apparatus 100 executes contents and displays an image including the contents (S110). When receiving input of an instruction from a user (S120) to run a second content, which is different from the first contents being executed, the display apparatus 100 runs and displays the second content according to the user input (S130) and shuts down the first contents being executed (S140). Accordingly, only a single content may be run at a given time.

When the first contents are shut down, the display apparatus 100 stores information about the shut down first contents (S150) which have been shut down. Here, the stored information may include the kind of first contents, a time at which the contents are paused, a screen at a time of pausing the contents, and the like. The information may be stored in a storage device including a nonvolatile memory, e.g., a hard disk drive, embedded in or communicating with the display apparatus 100.

The display apparatus 100 generates and displays a UI regarding the shut down first contents (S160). Here, the displayed UI may include a plurality of UIs which respectively correspond to the first contents, and each of the UIs may be displayed as a thumbnail image which corresponds to a screen at a time when the first contents are shut down, with information such as the kind and title of the contents being presented together.

When executing a third content, different from the first contents and the second content, while the second content is running, the display apparatus 100 may display together the UI regarding the first contents and a UI regarding the second content. Accordingly, a history of contents run through the display apparatus 100 may be readily identified.

The UIs may be displayed in order of latest shut down or execution frequency, which has been described with reference to FIG. 3.

A user may select a particular UI from among the displayed UIs and run a content which corresponds to the selected UI. Here, the display apparatus 100 may resume execution of the content from a time of shutting down the content. Accordingly, when the user reruns the previously used content after changing a content, the user may conveniently resume the content from a part of the content that was being run at the time of shut down. In particular, when only a single content is allowed to run due to limitations in hardware, the user may arbitrarily conduct a change of contents.

Figure 5:
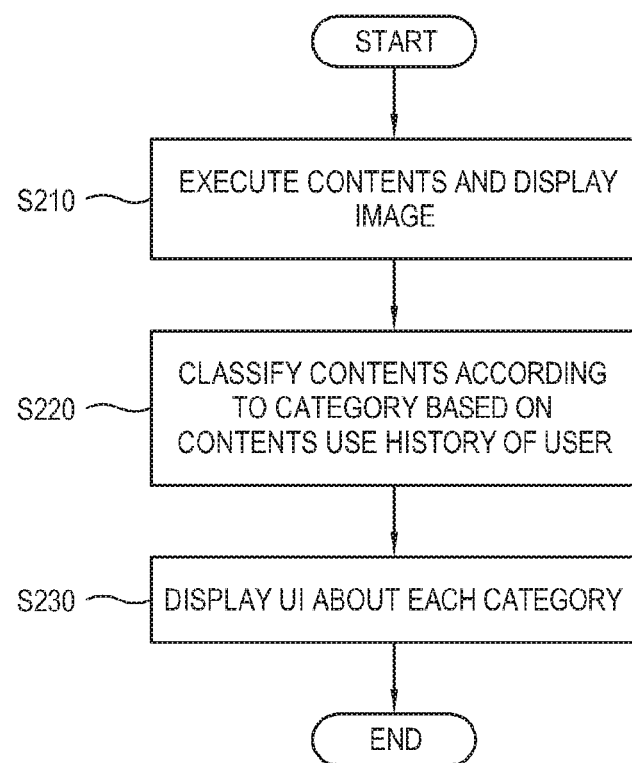
FIG. 5 is a second flowchart illustrating a control process of the display apparatus according to the exemplary embodiment.

FIG. 5 is a first flowchart illustrating a control process of the display apparatus 100 according to an exemplary embodiment.

The display apparatus 100 executes contents and displays an image including the contents (S210). The display apparatus 100 classifies the contents according to a category based on a user history of contents use (S220). The use history corresponds to a list of contents run through the display apparatus 100.

The display apparatus 100 displays UIs in each category (S130). An illustrative example of displaying UIs has been described above with reference to FIG. 2.

When a UI in a particular category is selected according to a user's input, a content that was most recently shut down may be run among contents included in the category. Alternatively, a content executed that is most frequently may be run among contents included in the category.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display;
   a tuner;
   a first interface configured to connect to an external device;
   a second interface configured to connect to a network;
   a storage; and
   a controller configured to:
   control the display to display first content from among a broadcast content of a broadcast channel received via the tuner, a media file content received via the first interface, and an application content received via the second interface,
   based on a user input for displaying a second content different from the first content, store information regarding the first content in the storage, and
   based on the stored information, control the display to display a content bar including a first category user interface (UI) item in connection with the tuner, a second category UI item in connection with the first interface, and a third category UI item in connection the second interface, one category UI item among the first category UI item, the second category UI item and the third category UI item representing the first content,
   wherein the controller is further configured to arrange the first category UI item, the second category UI item and the third category UI item in order associated with a last display time of a respective content.

2. The display apparatus of claim 1, wherein one of the first to third category UI items comprises a thumbnail image corresponding to a screen when the first content is shut down.

3. The display apparatus of claim 1, wherein the controller is configured to display another UI item for indicating a recently connected image source together with the first to third category UI items in the content bar.

4. The display apparatus of claim 1, wherein the content bar comprises the first to third category UI items arranged in a horizontal or vertical direction.

5. The display apparatus of claim 1, wherein the first to third category UI items comprises a thumbnail image which presents information on a last displayed channel, a last reproduced media file content or a last used application content.

6. The display apparatus of claim 1, wherein the controller is configured to receive a user input to select a UI item from the first to third category UI items in the content bar.

7. The display apparatus of claim 1, wherein the controller is configured to display the first to third category UI items which are arranged in order of execution frequency in the content bar.

8. The display apparatus of claim 1, wherein the controller is configured to display the content of the broadcast channel, the media file content or a screen of the application content from a time or position at which the respective content was paused.

9. A control method to control a display apparatus, the method comprising:
   displaying a first content from among a broadcast content of a broadcast channel received via a tuner, a media file content received via a first interface configured to connect to an external device, an application content received via a second interface configured to connect to a network;
   based on a user input for displaying a second content different from the first content, storing information regarding the first content in a storage;
   based on the stored information, displaying a content bar including a first category user interface (UI) item in connection with the tuner, a second category UI item in connection with the first interface, and a third category UI item in connection with the second interface, one category UI item among the first category UI item, the second category UI item and the third category UI item representing the first content;
   wherein the method further comprises arranging the first category UI item, the second category UI item and the third category UI item in order associated with a last display time of a respective content.

10. The control method of claim 9, wherein one of the first to third category UI items comprises a thumbnail image corresponding to a screen when the first content is shut down.

11. The control method of claim 9, further comprising displaying another UI item for indicating a recently connected image source together with the first to third category UI items in the content bar.

12. The control method of claim 9, wherein the content bar comprises the first to third category UI items arranged in a horizontal or vertical direction.

13. The control method of claim 9, wherein the first to third category UI items comprises a thumbnail image which presents information on a last displayed channel, a last reproduced media file content or a last used application content.

14. The control method of claim 9, further comprising receiving a user input to select a UI item from the first to third category UI items in the content bar.

15. The control method of claim 9, wherein the displaying the content bar comprises displaying the first to third category UI items which are arranged in order of execution frequency in the content bar.

16. The control method of claim 9, further comprising displaying the content of the broadcast channel, the media file content or a screen of the application content from a time or position at which the respective content was paused.

17. The display apparatus of claim 1, wherein the content bar is configured to provide only one category UI item for each category previously used on the display apparatus.

18. The display apparatus of claim 1, wherein the controller is configured to store first history information regarding recently displayed broadcast contents,
   second history information regarding recently displayed media contents and third history information regarding recently executed applications, and
   wherein:
   the first category UI item designated in connection with the tuner is generated by identifying a last displayed broadcast content of the broadcast channel based on the first history information and linking a thumbnail image associated with the identified last displayed broadcast content of the broadcast channel with the first category UI item, and the second category UI item designated in connection with the first interface is generated by identifying a last reproduced media file content received via the first interface based on the second history information and linking a thumbnail image associated with the identified last reproduced media file content with the second category UI item, and the third category UI item designated in connection with the second interface is generated by identifying a last used application content based on the third history information and linking a thumbnail image associated with the identified last used application content with the third category UI item.

19. The control method of claim 9, further comprising storing first history information regarding recently displayed broadcast contents, second history information regarding recently displayed media contents and third history information regarding recently executed applications, and wherein:

the first category UI item in connection with the tuner is generated by identifying a last displayed broadcast content of the broadcast channel based on the first history information and linking a thumbnail image associated with the identified last displayed broadcast content of the broadcast channel with the first category UI item, and the second category UI item in connection with the first interface is generated by identifying a last reproduced media file content received via the first interface based on the second history information and linking a thumbnail image associated with the identified last reproduced media file content with the second category UI item, and the third category UI item in connection with the second interface is generated by identifying a last used application content based on the third history information and linking a thumbnail image associated with the identified last used application content with the third category UI item.

20. The display apparatus of claim 1, wherein the information regarding the first content comprises a thumbnail image corresponding to a screen when the first content is shut down.

21. The display apparatus of claim 1, wherein the controller is further configured to arrange the first category UI item, the second category UI item and the third category UI item in the order associated with a time when displaying of the respective content is shut down.

22. The control method of claim 9, wherein the information regarding the first content comprises a thumbnail image corresponding to a screen when the first content is shut down.

23. The control method of claim 9, further comprising arranging the first category UI item, the second category UI item and the third category UI item in the order associated with a time when displaying of the respective content is shut down.

* * * * *